Patented July 21, 1942

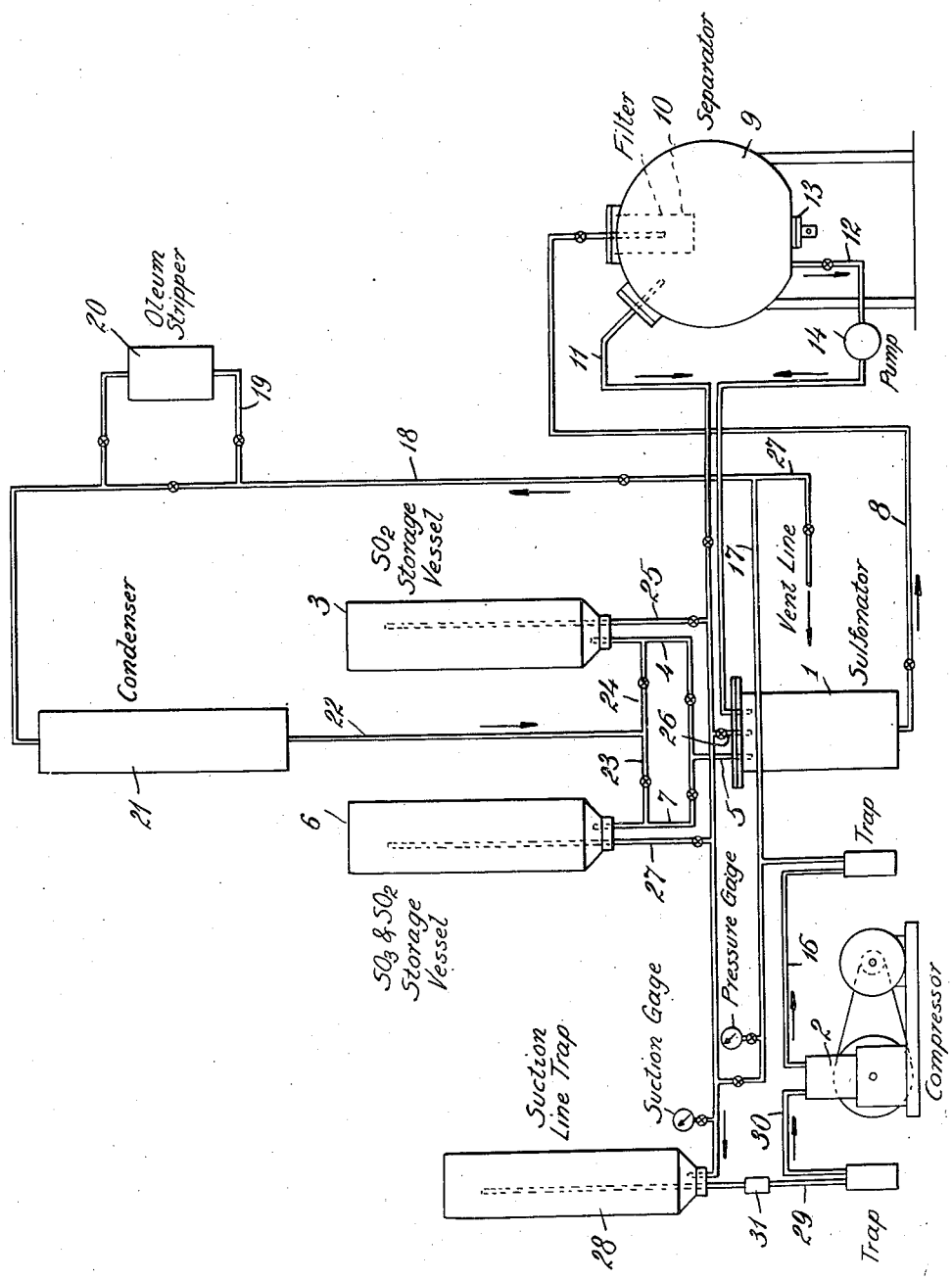

2,290,167

UNITED STATES PATENT OFFICE 2,290,167

PREPARATION OF SULPHONATION DERIVATIVES

Richard C. Datin, Petersburg, Va., assignor to The Solvay Process Company, New York, N. Y., a corporation of New York Application August 14, 1939, Serial No. 290,109

16 Claims. (Cl. 260—400)

This invention relates to an improvement in the process of preparing sulphonation derivatives of saturated higher fatty acids, higher dialkyl ketones, higher aliphatic alcohols, and long-chain alkyl aromatic compounds in which the compounds are reacted with a sulphonating agent in the presence of liquid sulphur dioxide as the solvent medium. More particularly it relates to an improvement in the step of separating such sulphonation derivatives from a liquid sulphur dioxide medium wherein the derivatives have been prepared.

The above sulphonation derivatives can be prepared by causing sulphonating agents to act on the compounds in a solvent medium consisting essentially of sulphur dioxide. In these sulphonations the usual sulphonating agent is sulphur trioxide, although chlorsulphonic acid and oleum are also of interest as sulphonating agents. The reaction mixture existing after the completion of the sulphonation comprises a sulphur dioxide solution of the sulphonation derivative and unreacted sulphonating agent. In order to recover the sulphonation derivative from the reaction mixture, the ordinary method has been to evaporate off all of the sulphur dioxide removable by this means and also a portion at least of the unused sulphur trioxide, if this compound has been used as the sulphonating agent. The residue remaining after the removal of the sulphur dioxide is then mixed with water, neutralized, and the neutralized sulphonation derivative is recovered, as by drying the mass. The sulphur dioxide removed by vaporization may be recovered by condensation for reuse in the process.

While this procedure is reasonably satisfactory, it has the disadvantage that the vaporized sulphur dioxide must be condensed to the liquid form if it is to be reused effectively. The condensation of the vaporized sulphur dioxide involves considerable time and the expense of providing adequate apparatus. This procedure has the further disadvantages that the impurities present in the initial materials or formed during the reaction remain in the final mass and the residual sulphur trioxide is not removed effectively at the time of evaporating the sulphur dioxide.

It is a principal object of the present invention to provide an efficient and economical process of recovering sulphonation derivatives of saturated higher fatty acids, higher dialkyl ketones, higher aliphatic alcohols, or long-chain alkyl aromatic compounds, and the sulphur dioxide from sulphonation reaction mixtures in which liquid sulphur dioxide has been used as the solvent medium. Another object of the invention is to provide a process for recovering such sulphonation derivatives from solution in liquid sulphur dioxide. A more specific object of the invention is to provide an efficient process for recovering from the resulting reaction mixture sulphonation derivatives of saturated higher fatty acids prepared by the action of sulphur trioxide in a solvent medium consisting of liquid sulphur dioxide.

Other objects of the invention in part will be obvious and in part will appear hereinafter.

As pointed out above, the present invention is concerned primarily with an improvement in the process of preparing sulphonation derivatives of saturated higher fatty acids, higher dialkyl ketones, higher aliphatic alcohols, and long-chain alkyl aromatic compounds. The sulphonation derivatives of saturated higher fatty acids contain alpha-sulphonic acid groups, the derivatives of higher dialkyl ketones contain at least one sulphonic acid group attached to an alpha carbon atom, the derivatives of higher aliphatic alcohols are alkyl acid sulphuric acid esters, and the derivatives of long-chain alkyl aromatic compounds contain at least one sulfonic acid group attached to the aryl nucleus. All of these compounds are characterized by containing in their molecules at least one straight or branched chain alkyl group containing at least 8, and preferably 12 to 18 carbon atoms. They are relatively soluble in water, and possess surface active properties making them valuable detergents, and wetting, dispersing, emulsifying, and the like agents. It has been discovered in accordance with the present invention that by subjecting a solution of a sulphonation derivative of this class in liquid sulphur dioxide to the process described below it is possible to recover efficiently both the sulphonation derivative and the sulphur dioxide. The process comprises evaporating a portion of the liquid sulphur dioxide to cool the solution and precipitate therefrom the sulphonation derivative. The evaporation of the liquid sulphur dioxide is carried out without heating the solution, preferably under substantially adiabatic conditions, the heat removed due to the evaporation of the sulphur dioxide serving to reduce the temperature of the remainder of the solution to the desired low point. As a result of this procedure there is obtained a mass from which it has been found to be possible to recover by filtration the sulphonation derivative free from the major portion of the liquid sulphur dioxide. The filtrate obtained is composed principally of liquid sulphur dioxide together with unreacted sulphur trioxide and impurities soluble in this medium, and can be used in succeeding runs of the sulphonation process.

The present process is particularly valuable for the recovery of sulphonation derivatives of saturated higher fatty acids, for example, saturated higher fatty acids containing 8 to 24 carbon atoms and especially 14 to 18 carbon atoms, from sulphonation reaction mixtures in which the derivatives have been formed by the action of sulphur trioxide in a solvent medium consisting essentially of liquid sulphur dioxide. The preparation of the sulphonation derivatives is preferably carried out by preparing a reaction mixture containing about 100 to 150 mols of liquid sulphur dioxide and about 2.5 to 3 mols of sulphur trioxide for each mol of fatty acid, and maintaining this mixture at temperatures in the neighborhood of 20° to 40° C. in a closed vessel adapted to resist the pressure exerted by vapors of sulphur dioxide at these temperatures until completion of sulphonation, usually 6 to 20 hours. The reaction mixture remaining at the end of the sulphonation procedure comprises the sulphonation derivatives, unreacted sulphur trioxide and impurities in solution in liquid sulphur dioxide. By releasing the pressure on the mixture so as to evaporate a portion of the liquid sulphur dioxide under substantially adiabatic conditions, the temperature of the mixture can be reduced to as low a point as is necessary to cause precipitation of the sulphonation derivatives, for example, to a temperature of $-10°$ C., which has been found to be a sufficiently low temperature in most cases. The portion of liquid sulphur dioxide required to be evaporated to effect this result will vary depending principally upon the efficiency with which the apparatus employed is protected against heat exchange with the atmosphere. In the usual case evaporation of 15 to 25 weight per cent of the liquid sulphur dioxide present in the reaction mixture is sufficient to produce the desired result. The sulphur dioxide evaporated in this way is preferably condensed for reuse in the process. The mass remaining after evaporation of the portion of liquid sulphur dioxide comprises the solid sulphonation derivatives in admixture with liquid sulphur dioxide. The liquid sulphur dioxide can be separated from the sulphonation derivatives by a simple filtration, although centrifugal filtration may be used if desired. The filter cake thus obtained free from the bulk of the liquid sulphur dioxide, may be further treated in any desired manner. If the filter cake is to be converted into alkali metal salts it may be dissolved in water and neutralized therein with a suitable alkaline compound. When proceeding in this way it is advisable to remove occluded sulphur dioxide either by blowing with air or evacuating before dissolving in water or preferably by blowing the aqueous solution with air.

As above indicated, the filtrate consisting of liquid sulphur dioxide, impurities soluble therein, and unreacted sulphur trioxide may be used in a succeeding run of the process. In using the filtrate in succeeding runs, it can be recycled a number of times (for example, for use in the preparation of five or six sulphonation batches) and then, if the content of impurities is undesirably high, it can be evaporated completely. The residual non-volatile compounds are removed from the process and the sulphur dioxide, together with the sulphur trioxide contained therein, is recovered for reuse. Alternatively, a minor proportion (e. g., 10 to 25 per cent) can be removed from the filtrate of each batch, and the sulphur dioxide, together with sulphur trioxide, evaporated and recovered. This latter procedure results in a bleed of impurities from the process and prevents the building up of a high impuritity content in the solvent liquid sulphur dioxide.

It will be observed that by proceeding as above described, only a portion of the liquid sulphur dioxide is vaporized. Hence, only this portion need be condensed in order to recover this agent, most of the sulphur dioxide being in the filtrate resulting from the filtration of the cooled reaction mixture. Because of their solubility in liquid sulphur dioxide, a large proportion of the impurities present in the reaction mixture appear in the filtrate. The sulphonation derivatives are obtained in substantially dry form and in certain cases may be neutralized directly.

The class of sulphonation derivatives which can be separated from solution in liquid sulphur dioxide in accordance with the process of the present invention includes a wide variety of sulphonic acids of saturated higher fatty acids, sulphonic acids of higher dialkyl ketones, higher alkyl acid sulfuric acid esters, and long-chain alkyl aromatic sulphonic acids. For example, this class includes alpha-sulphonic acid derivatives of such fatty acids as myristic acid, palmitic acid, stearic acid, arachidic acid, behenic acid, and lignoceric acid; sulphonic acids of such dialkyl ketones as the ketones corresponding to these fatty acids; acid sulphuric acid esters of such aliphatic alcohols as the mixed alcohols obtainable by reduction of cocoanut, babasu, and palm-kernel oils, lauryl alcohol, and cetyl alcohol; and sulphonic acids of alkyl aromatic compounds such as nuclearly alkylated compounds of the benzene or naphthalene series (e. g., benzene, phenol, and naphthalene) wherein the alkyl groups contain at least 8 and preferably 12 to 18 carbon atoms, which alkyl aromatic compounds are obtainable by condensing the desired aromatic compound with a higher alcohol, an olefine or a mixture of olefines, or an alkyl halide or a mixture of alkyl halides such as may be prepared by halogenation of a petroleum distillate containing a high proportion of paraffin hydrocarbons.

It will be realized that the efficiency of the separation process will vary depending upon the particular sulphonation derivative present in the liquid sulphur dioxide solution. In certain cases a substantial portion of the sulphonation derivative may remain soluble in the liquid sulphur dioxide and pass with this solvent into the filtrate. Even in these cases the procedure is of advantage since it provides a means for obtaining quickly and easily a portion of the total amount of the sulphonation derivative relatively free from impurities soluble in liquid sulphur dioxide, as to which portion the old method of separation is not required. In cases where a substantial proportion of the sulphonation derivatives remain in the filtrate and these derivatives do not undergo undesirable attack on being subjected to additional sulphonating conditions, the filtrate may be returned to a subsequent sulphonation batch. On the other hand, if the sulphonation derivatives are undesirably affected by further sulphonation, they are preferably recovered from the filtrate; for example, by evaporating off the liquid sulphur dioxide contained therein.

For a fuller understanding of the nature and objects of the invention, reference should be had to the following detailed description taken in connection with the accompanying drawing in which the single figure is a view representing in more or less diagrammatic form an apparatus suitable for use in carrying out the present process.

In the drawing the numeral 1 represents a vessel provided with a heating jacket and a stirrer, not shown, which is adapted to be used in carrying out sulphonation reactions and is hereinafter referred to as a sulphonator. The numeral 2 represents a compressor of conventional construction and 3 represents a storage vessel which is adapted to contain liquid sulphur dioxide and which is connected to sulphonator 1 through pipes 4 and 5. The numeral 6 represents a vessel similar to storage vessel 3. This vessel is adapted to contain a solution of sulphur trioxide in liquid sulphur dioxide and is provided with a pipe 7 connected with pipe 5 leading into sulphonator 1. A pipe 8 leads from sulphonator 1 to a vessel 9 which is employed in the separation of sulphonation derivatives from solution in sulphur dioxide and is referred to hereinafter as a separator. The separator 9 has suspended from the top thereof a removable filter 10 which is preferably made up of a supporting screen and cloth bag. The separator also has connected thereto a pipe 11 leading to the suction side of the compressor 2, a pipe 12 for conducting liquid sulphur dioxide to the sulphonator 1, and a means 13 for dumping the contents thereof. In the pipe line 12 there is a pump 14. Leading from the pressure side of the compressor 2 there is provided a system of pipes 16, 17, and 18 for conducting sulphur dioxide under pressure to the pipe 19 leading to an oleum stripper 20, or, alternatively, directly to a condenser 21. The oleum stripper may be any suitable arrangement of elements adapted to contain oleum and permit the passage of sulphur dioxide gas therethrough so as to charge it with sulphur trioxide by removal from the oleum. From the condenser 21, which is conveniently of the submerged coil type, a pipe 22 leads through pipe 23 to the pipe 7 whereby a solution of sulphur trioxide in liquid sulphur dioxide may be conducted into storage vessel 6, or alternatively, through pipe 24 to the pipe 4 whereby liquid sulphur dioxide may be conducted into storage vessel 3. The apparatus is provided with means including pipes 25, 11, 26, and 27, trap 28, and pipes 29 and 30, connected to the suction side of the compressor for the purpose of reducing the pressure in the apparatus, and a vent line 27 which may be opened if desired when the pressure in any given unit is to be reduced. The apparatus is also provided with a drier 31 to remove moisture from the gases entering the compressor, and with suitable valves, gages, and traps.

The operation of the apparatus shown will be described in connection with the preparation of the sulphonation derivative of stearic acid by the action of sulphur trioxide in a solvent medium consisting of liquid sulphur dioxide. The parts referred to are by weight.

The process is started by introducing into sulphonator 1 a charge of 5 parts of finely-divided stearic acid. The sulphonator is then evacuated by means of the compressor 2. With the stirrer in operation, about 70 parts of liquid sulphur dioxide are run into the sulphonator from storage vessel 3 through pipes 4 and 5. Then 50 parts of liquid sulphur dioxide containing 4 parts of sulphur trioxide are introduced into the sulphonator from the storage vessel 6 through pipes 7 and 5. After loading, the temperature of the charge in the sulphonator is brought up to about 40° C. by admitting steam and water into the jacket of the sulphonator. These conditions are maintained in the sulphonator for a period of time sufficient to complete the sulphonation, usually about 6 to 20 hours. After completion of the sulphonation, the valves in pipe 8 are opened and batches consisting of 10 to 20 parts of the reaction mixture in the sulphonator are periodically discharged from the sulphonator into the filter 10 in the separator 9. This discharge is caused by the difference in pressure between the sulphonator and the separator, the pressure in the latter unit at the beginning of the operation being atmospheric or below. The compressor is operated to exhaust the portion of sulphur dioxide which is required to be vaporized in lowering the temperature of the reaction mixture to a suitable low temperature; for example, —10° C. The unvaporized liquid sulphur dioxide passes through the filter bag into the bottom of separator 9. The filter cake remaining in the filter bag consists of the sulphonation derivative of stearic acid together with a proportion of occluded sulphur dioxide. The operations taking place in the separator 9 are conducted so that after sufficient of the liquid sulphur dioxide has been evaporated to reduce the temperature of the sulphur dioxide solution to the desired point, evaporation of sulphur dioxide is halted by closing the valve in pipe 11. Ordinarily the liquid sulphur dioxide in the bottom of the separator is removed through pipe 12 by means of pump 14 and is returned to the sulphonator for reuse in the process.

The sulphur dioxide evaporated from the sulphonation reaction mixture in the separator passes through pipes 11 and 29 to the compressor whence it passes under pressure through pipes 16, 17, and 18 to the condenser 21 directly, or after first passing through the oleum stripper 20. In ordinary operation this portion of sulphur dioxide is employed in making up the sulphur trioxide-sulphur dioxide solution in storage vessel 6. When used for this purpose, it is passed through the oleum stripper and removes sulphur trioxide from the oleum contained therein. The mixed sulphur trioxide and sulphur dioxide gases leaving the oleum stripper pass to the condenser where they are liquefied and flow into vessel 6. If the sulphur dioxide is not to be used for this purpose, it is passed directly into the condenser and thence to the sulphur dioxide storage vessel 3.

As before stated, the filtrate passed from the separator to the sulphonator contains sulphur trioxide, impurities, and some unprecipitated sulphonation derivatives in solution in sulphur dioxide. In proportioning the charge in the sulphonator in subsequent operations of the process, the content of sulphur trioxide in the filtrate should be taken into account, thus reducing the amount of sulphur trioxide introduced from the solution in storage vessel 6.

As the process is repeated, the content of impurities in the filtrate builds up. As pointed out above, in accordance with one manner of proceeding, when this content is so great as to introduce impurities into the precipitated sulphonation derivative, the filtrate is removed from the system and separately treated to recover the sulphur dioxide, together with sulphur trioxide, and, if desired, also the sulphonation derivative contained therein. This can be done in the apparatus disclosed by evaporating off all of the sulphur dioxide and sulphur trioxide in the filtrate in the bottom of separator 9. These gases pass through pipe 11, trap 28, the compressor 2, pipes 17 and 18, condenser 21, and thence to storage vessel 6. The residue remaining in the separator may be treated for recovery of sulphonation derivative or discarded. Alternatively, at the end of each separation, the major portion of the filtrate may be returned to the sulphonator and a minor portion, say 10 to 25 per cent may be retained in the separator and there treated so as to vaporize the sulphur dioxide together with the sulphur trioxide. The resulting gases are condensed as described above and returned to storage vessel 6. The residue, consisting mainly of impurities, is discarded. By this means the impurities are bled from the cycle and undesirable build-up of impurities in the liquid sulphur dioxide used in the sulphonation is prevented.

As noted above, the filter cake obtained as a result of the procedure described is free from a large proportion of the impurities soluble in liquid sulphur dioxide which are present in the reaction mixture. Also, the filter cake is in dry form and may be neutralized effectively without the necessity for dissolving it in water.

It will be understood that the specific procedure described above is merely illustrative of the operation of the present process. For example, although the process as carried out in the apparatus illustrated in the drawing makes use of a simple bag filter, equivalent results may be obtained by employing a centrifugal filter in the filtration. Also, while the specific conditions of operation referred to in the above example, including the relative amounts of organic compound, liquid sulphur dioxide, and sulphur trioxide, are preferred conditions for the preparation of alpha-sulphonic acid derivatives of saturated higher fatty acids and hence any of those mentioned can be substituted on an equimolecular basis for the stearic acid used, when preparing other sulphonation derivatives by sulphonation with sulphur trioxide in the presence of liquid sulphur dioxide, it is generally preferable to vary these conditions. For example, to prepare the sulphonation derivatives of mixed higher dialkyl ketones obtained by ketonization of the fatty acids of cocoanut oil, the above example would be varied by using for each 5 parts by weight of the mixed ketones, a total of 145 parts by weight of liquid sulphur dioxide, and 6 parts of sulphur trioxide.

The alpha-sulphonic derivatives of saturated higher fatty acids can be prepared by using as starting materials the anhydrides, salts, esters, and amides of the fatty acids in place of the free acids. In any case the sulphonation derivatives obtained are predominantly in the form of the free acids.

It will thus be seen that the present invention provides a process for separating sulphonation derivatives of saturated higher fatty acids, higher dialkyl ketones, higher aliphatic alcohols, and long-chain alkyl aromatic sulphonates from solution in liquid sulphur dioxide which involves the material advantages of reducing the amount of sulphur dioxide required to be evaporated and condensed, and of yielding sulphonation derivatives free from a large proportion of impurities soluble in liquid sulphur dioxide.

Since changes may be made in the process described above without departing from the invention, it is intended that the description shall be interpreted as illustrative and not in a limiting sense.

I claim:

1. In the process for the preparation of a sulphonation derivative selected from the group consisting of sulphonation derivatives of saturated higher fatty acids, sulphonation derivatives of higher dialkyl ketones, higher alkyl acid sulphuric acid esters, and long-chain alkyl aromatic sulphonic acids wherein the sulphonation derivative is formed in a sulphonation reaction mixture in which liquid sulphur dioxide is the solvent medium, the improvement which comprises evaporating a portion of the liquid sulphur dioxide from the reaction mixture to cool the reaction mixture and precipitate the sulphonation derivative, thereby forming a mixture containing the precipitated sulphonation derivative in contact with a liquid sulphur dioxide solution, and separating the precipitated sulphonation derivative from the liquid sulphur dioxide solution.

2. In the process for the preparation of a sulphonation derivative selected from the group consisting of sulphonation derivatives of saturated higher fatty acids, sulphonation derivatives of higher dialkyl ketones, higher alkyl acid sulphuric acid esters, and long-chain alkyl aromatic sulphonic acids wherein the sulphonation derivative is formed in a sulphonation reaction mixture in which liquid sulphur dioxide is the solvent medium, the improvement which comprises evaporating a portion of the liquid sulphur dioxide from the reaction mixture to cool said reaction mixture and precipitate the sulphonation derivative, thereby forming a mixture containing the precipitated sulphonation derivative in contact with a liquid sulphur dioxide solution, and filtering said last-mentioned mixture to recover the precipitated sulphonation derivative.

3. In the process for the preparation of a sulphonation derivative selected from the group consisting of sulphonation derivatives of saturated higher fatty acids, sulphonation derivatives of higher dialkyl ketones, higher alkyl acid sulphuric acid esters, and long-chain alkyl aromatic sulphonic acids wherein the sulphonation derivative is formed by the action of sulphur trioxide in a sulphonation reaction mixture in which liquid sulphur dioxide is the solvent medium, the improvement which comprises evaporating a portion of the liquid sulphur dioxide from the reaction mixture under substantially adiabatic conditions to cool said reaction mixture and precipitate the sulphonation derivative, thereby forming a mixture containing the precipitated sulphonation derivative in contact with a liquid sulphur dioxide solution, and filtering said last-mentioned mixture to recover the precipitated sulfonation derivative.

4. In the process for the preparation of a sulphonation derivative of a higher fatty acid wherein the higher fatty acid is converted to the sulphonation derivative in a sulphonation reaction mixture in which liquid sulphur dioxide is the solvent medium, the improvement which comprises evaporating a portion of the liquid sulphur dioxide from the reaction mixture to cool said reaction mixture and precipitate the sulfonation derivative, thereby forming a mixture containing the precipitated sulphonation derivative in contact with a liquid sulphur dioxide solution, and filtering said last-mentioned mixture to recover the precipitated sulphonation derivative.

5. In the process for the preparation of a sulphonation derivative of a saturated fatty acid containing 8 to 24 carbon atoms, wherein the saturated fatty acid is converted to the sulphonation derivative in a sulphonation reaction mixture in which liquid sulphur dioxide is the solvent medium, the improvement which comprises evaporating a portion of the liquid sulphur dioxide from the reaction mixture under substantially adiabatic conditions to cool said reaction mixture and precipitate the sulphonation derivative, thereby forming a mixture containing the precipitated sulphonation derivative in contact with a liquid sulphur dioxide solution, and filtering said last-mentioned mixture to recover the precipitated sulphonation derivative.

6. In the process for the preparation of a sulphonation derivative of a saturated fatty acid containing 14 to 18 carbon atoms wherein the saturated fatty acid is converted to the sulphonation derivative by the action of sulphur trioxide in a sulphonation reaction mixture in which liquid sulphur dioxide is the solvent medium, the improvement which comprises evaporating a portion of the liquid sulphur dioxide from the reaction mixture under substantially adiabatic conditions to cool said reaction mixture and precipitate the sulphonation derivative, thereby forming a mixture containing the precipitated sulphonation derivative in contact with a liquid sulphur dioxide solution, and filtering said last-mentioned mixture to recover the precipitated sulphonation derivative.

7. In the process for the preparation of the sulphonation derivative of stearic acid wherein the stearic acid is converted to the sulphonation derivative by the action of sulphur trioxide in a sulphonation reaction mixture in which liquid sulphur dioxide is the solvent medium, the improvement which comprises evaporating a portion of the liquid sulphur dioxide from the reaction mixture under substantially adiabatic conditions to cool said reaction mixture and precipitate the sulphonation derivative, thereby forming a mixture containing the precipitated sulphonation derivative in contact with a liquid sulphur dioxide solution, and filtering said last-mentioned mixture to recover the precipitated sulphonation derivative.

8. In the process for the preparation of a sulphonation derivative selected from the group consisting of sulphonation derivatives of saturated higher fatty acids, sulphonation derivatives of higher dialkyl ketones, higher alkyl acid sulphuric acid esters, and long-chain alkyl aromatic sulphonic acids wherein the sulphonation derivative is formed in a sulphonation reaction mixture in which liquid sulphur dioxide is the solvent medium, the improvement which comprises evaporating a portion of the liquid sulphur dioxide from the reaction mixture under substantially adiabatic conditions to cool said reaction mixture and precipitate the sulphonation derivative, thereby forming a mixture containing the precipitated sulphonation derivative in contact with a liquid sulphur dioxide solution, filtering said last-mentioned mixture to separate the precipitated sulphonation derivative from a filtrate consisting of a liquid sulphur dioxide solution, and returning at least a portion of said liquid sulphur dioxide solution for use in a subsequent sulphonation reaction.

9. In the process for the preparation of a sulphonation derivative selected from the group consisting of sulphonation derivatives of saturated higher fatty acids, sulphonation derivatives of higher dialkyl ketones, higher alkyl acid sulfuric acid esters, and long-chain alkyl aromatic sulfonic acids wherein the sulphonation derivative is formed in a sulphonation reaction mixture in which liquid sulphur dioxide is the solvent medium, the improvement which comprises evaporating a portion of the liquid sulphur dioxide from the reaction mixture under substantially adiabatic conditions to cool said reaction mixture and precipitate the sulphonation derivative, thereby forming a mixture containing the precipitated sulphonation derivative in contact with a liquid sulphur dioxide solution, filtering said last-mentioned mixture to separate the precipitated sulphonation derivative from a filtrate consisting of a liquid sulphur dioxide solution, returning said liquid sulphur dioxide solution for use in a subsequent sulphonation reaction, repeating the sulphonation with return of filtered liquid sulphur dioxide solution until said solution becomes contaminated with impurities, then evaporating the filtered liquid sulphur dioxide solution, and recovering vaporized sulphur dioxide.

10. In the process for the preparation of a sulphonation derivative selected from the group consisting of sulphonation derivatives of saturated higher fatty acids, sulphonation derivatives of higher dialkyl ketones, higher alkyl acid sulfuric acid esters, and long-chain alkyl aromatic sulphonic acids wherein the sulphonation derivative is formed in a sulphonation reaction mixture in which liquid sulfur dioxide is the solvent medium, the improvement which comprises evaporating a portion of the liquid sulphur dioxide from the reaction mixture under substantially adiabatic conditions to cool said reaction mixture and precipitate the sulphonation derivative, thereby forming a mixture containing the precipitated sulphonation derivative in contact with a liquid sulphur dioxide solution, filtering said last-mentioned mixture to separate the precipitated sulphonation derivative from a filtrate consisting of a liquid sulphur dioxide solution, returning a portion of said liquid sulphur dioxide solution to a subsequent sulphonation reaction, evaporating the remainder of the liquid sulphur dioxide solution, recovering the vaporized sulphur dioxide, and repeating the process with return of a portion of filtered liquid sulphur dioxide solution to a subsequent sulphonation reaction, vaporization of the remainder of filtered liquid sulphur dioxide solution, and recovery of vaporized sulphur dioxide.

11. In the process for the preparation of a sulphonation derivative of a saturated fatty acid containing 8 to 24 carbon atoms, wherein the saturated fatty acid is converted to the sulphonation derivative by the action of sulphur trioxide in a sulphonation reaction mixture in which liquid sulphur dioxide is the solvent medium, the improvement which comprises evaporating a portion of the liquid sulphur dioxide from the reaction mixture under substantially adiabatic conditions to cool said reaction mixture and precipitate the sulphonation derivative, thereby forming a mixture containing the precipitated sulphonation derivative in contact with a liquid sulphur dioxide solution, filtering said last-mentioned mixture to separate the precipitated sulphonation derivative from a filtrate consisting of a liquid sulphur dioxide solution, and returning at least a portion of said liquid sulphur dioxide solution for use in a subsequent sulphonation reaction.

12. In the process for the preparation of the sulphonation derivative of stearic acid wherein one mol of the stearic acid is converted to the sulphonation derivative by the action of 2.5 to 3.0 mols of sulphur trioxide in a sulphonation reaction mixture containing 100 to 150 mols of liquid sulphur dioxide as the solvent medium, the improvement which comprises evaporating a portion of the liquid sulphur dioxide from the reaction mixture under substantially adiabatic conditions to cool said reaction mixture to about −10° C. and precipitate the sulphonation derivative, thereby forming a mixture containing the precipitated sulphonation derivative in contact with a liquid sulphur dioxide solution, filtering said last-mentioned mixture to separate the precipitated sulphonation derivative from a filtrate consisting of a liquid sulphur dioxide solution, and returning at least a portion of said liquid sulphur dioxide solution for use in a subsequent sulphonation.

13. The process for recovering a sulphonation derivative selected from the group consisting of sulphonation derivatives of saturated higher fatty acids, sulphonation derivatives of higher dialkyl ketones, higher alkyl acid sulphuric acid esters, and long-chain alkyl aromatic sulphonic acids from solution in liquid sulphur dioxide, which comprises evaporating a portion of the liquid sulphur dioxide under substantially adiabatic conditions to cool the solution and precipitate the sulphonation derivative, thereby forming a mixture containing the precipitated sulphonation derivative in contact with a liquid sulphur dioxide solution, and filtering the mixture to recover the precipitated sulphonation derivative.

14. The process for recovering the sulphonation derivative of a saturated fatty acid containing 8 to 24 carbon atoms from solution in liquid sulphur dioxide, which comprises evaporating a portion of the liquid sulphur dioxide under substantially adiabatic conditions to cool the solution and precipitate the sulphonation derivative, thereby forming a mixture containing the precipitated sulphonation derivative in contact with a liquid sulphur dioxide solution, and filtering the mixture to recover the precipitated sulphonation derivative.

15. The process for the preparation of the sulphonation derivative of a saturated fatty acid containing 8 to 24 carbon atoms, which comprises sulphonating the fatty acid with sulphur trioxide in the presence of a solvent medium consisting of liquid sulphur dioxide at a temperature of 20° to 40° C., thereby producing a mixture comprising the sulphonation derivative in solution in liquid sulphur dioxide, evaporating a portion of the liquid sulphur dioxide under substantially adiabatic conditions to cool the solution to a temperature of about −10° C. and precipitate the sulphonation derivative, filtering the resulting mixture to separate the precipitated sulphonation derivative and obtain a liquid sulphur dioxide solution as a filtrate, and returning at least a portion of said liquid sulphur dioxide solution for use in a subsequent sulphonation reaction.

16. The process for the preparation of the sulphonation derivative of stearic acid which comprises reacting one mol of stearic acid with sulphur trioxide in the presence of a solvent medium consisting of 100 to 150 mols of liquid sulphur dioxide to a temperature of 20° to 40° C. for a period of 6 to 20 hours, thereby producing a solution comprising the sulphonation derivative dissolved in liquid sulphur dioxide, evaporating a portion of the liquid sulphur dioxide under substantially adiabatic conditions to cool the solution to about −10° C. and precipitate the sulphonation derivative, filtering the resulting mixture to separate the precipitated sulphonation derivative and obtain a liquid sulphur dioxide solution as a filtrate, and returning at least a portion of said liquid sulphur dioxide solution for use in a subsequent sulphonation reaction.

RICHARD C. DATIN.